(12) United States Patent
Cambon et al.

(10) Patent No.: US 8,186,401 B2
(45) Date of Patent: May 29, 2012

(54) TREAD COMPRISING RELIEF ELEMENTS COVERED BY A SPECIFIC MIXTURE

(75) Inventors: Stéphanie Cambon, Chamalieres (FR); Didier Vasseur, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 604 days.

(21) Appl. No.: 10/578,048

(22) PCT Filed: Oct. 29, 2004

(86) PCT No.: PCT/EP2004/012239
§ 371 (c)(1),
(2), (4) Date: Mar. 27, 2007

(87) PCT Pub. No.: WO2005/044594
PCT Pub. Date: May 19, 2005

(65) Prior Publication Data
US 2008/0041508 A1    Feb. 21, 2008

(30) Foreign Application Priority Data

Oct. 30, 2003    (FR) ...................................... 03 12740

(51) Int. Cl.
*B60C 1/00*    (2006.01)
*B60C 11/00*   (2006.01)
(52) U.S. Cl. ................................ 152/209.5; 152/209.18
(58) Field of Classification Search ............... 152/209.5, 152/209.18
See application file for complete search history.

(56) References Cited

U.S. PATENT DOCUMENTS 1,719,628 A * 7/1929 Sloman ........................ 152/209.5
(Continued)

FOREIGN PATENT DOCUMENTS

EP    0 510 550 A1    4/1992
(Continued)

OTHER PUBLICATIONS

Machine translation for Japan 2000-007832 (no date).*

*Primary Examiner* — Steven D Maki
(74) *Attorney, Agent, or Firm* — Cozen O'Connor

(57) ABSTRACT

A tire tread comprising a plurality of elements in relief (1) comprising a contact face (2) intended to come into contact with the roadway during travel and lateral faces (13, 14, 15, 16), the intersection of each lateral face with the contact face forming a ridge (23, 24, 25, 26). The tread also comprises a plurality of cutouts (3, 4) in the form of grooves and/or incisions, said cutouts being defined by facing main faces. Each tread pattern element (1) is formed with at least one rubber mix (referred to as "base mix"). This tread, viewed in section in a plane containing the thickness of this tread, has at least one face defining at least one cutout covered at least in part with a second rubber mix, referred to as "covering mix", this part having covering mix extending when new over a height Hr at least equal to 30% of the height H of the face, wherein at least one first base mix opens on to the contact face (2) when new or at the latest after wear at most equal to 10% of the height Hr. The base mix has an amount of carbon black greater than 2 phr of black and the covering mix has an amount of carbon black greater than 0 phr and at most equal to 2 phr.

9 Claims, 1 Drawing Sheet

SECTION LINE II-II

U.S. PATENT DOCUMENTS

| | | | |
|---|---|---|---|
| 4,519,430 A * | 5/1985 | Ahmad et al. | 152/209.1 |
| 4,668,728 A * | 5/1987 | Botzman | 524/394 |
| 5,840,137 A | 11/1998 | Futamura | |
| 5,904,792 A * | 5/1999 | Majumdar et al. | 156/128.6 |
| 5,957,179 A * | 9/1999 | Graas | 152/209.26 |
| 2003/0212185 A1* | 11/2003 | Vasseur | 524/492 |
| 2004/0050470 A1* | 3/2004 | Nishi | 152/209.5 |
| 2004/0118496 A1* | 6/2004 | Vannan et al. | 152/209.5 |
| 2005/0109436 A1* | 5/2005 | Bruant et al. | 152/209.1 |
| 2005/0211351 A1* | 9/2005 | Majumdar et al. | 152/209.6 |
| 2008/0121324 A1* | 5/2008 | Cambon et al. | 152/209.1 |

FOREIGN PATENT DOCUMENTS

| | | | |
|---|---|---|---|
| EP | 1 228 898 A | | 8/2002 |
| EP | 1 228 902 A | | 8/2002 |
| EP | 1 228 903 A | | 8/2002 |
| GB | 1124915 | * | 8/1968 |
| JP | 55-106803 | * | 8/1980 |
| JP | 64-074104 | * | 3/1989 |
| JP | 2000-007832 | * | 1/2000 |
| WO | 03/089257 | * | 10/2003 |

* cited by examiner

SECTION LINE II-II

TREAD COMPRISING RELIEF ELEMENTS COVERED BY A SPECIFIC MIXTURE

RELATED APPLICATION

This is a U.S. National Phase Application under 35 USC 371 of International Application PCT/EP2004/012239, filed on Oct. 29, 2004.

FIELD OF THE INVENTION

The invention relates to tires and more particularly to the treads of such tires.

BACKGROUND OF THE INVENTION

In order to obtain satisfactory performance during travel in particular on wet roads, it is known to provide a tread of a tire with a tread pattern formed by tread pattern elements which are separated from each other by cutouts (grooves of average width greater than or equal to 2.5 mm and/or incisions of average width less than 2.5 mm), these cutouts being obtained for example by moulding. The tread pattern elements thus formed comprise a contact face intended to come into contact with the roadway during travel and lateral faces also defining the cutouts; the intersection of each lateral face with the contact face forms a ridge which facilitates the contact of the tire with the roadway, and in particular when the latter is wet. More generally, a ridge is defined as the geometric limit of contact of a tread pattern element with the ground during travel.

Among tread pattern elements, a distinction is made between elements which do not run right around the tire (blocks) and elements which do run right around it (ribs). Furthermore, the tread pattern elements may comprise one or more incisions to form additional ridges, when each incision may or may not open on to at least one lateral face of the tread pattern element. By definition, an incision is the space defined by two main facing faces distant from each other by a width of less than 2.5 mm.

In improving the grip of the tire on a damp road, it is known that the very nature of the rubber mix (alternatively referred to as "rubber composition") forming the tread has a significant effect. Thus, a tread of a tire made of rubber mix having a better grip on wet ground makes it possible to obtain improved performance during travel in wet ground conditions. However, in parallel to this improvement in grip performance on wet ground, as a general rule a loss of wear performance on a dry road occurs, which results in a reduced wear life and necessitates more frequent changing of the tires on a vehicle.

Consequently, there is a need for a tire the tread of which retains good wear life performance while substantially improving the grip performance on wet ground.

SUMMARY OF THE INVENTION

One aspect of the present invention is directed to a plurality of elements in relief (ribs and/or blocks) comprising at least one lateral face and one contact face intended to be in contact along a surface of contact with the roadway during travel of a tire provided with said tread, the limit of the surface of contact of the contact face with the ground forming at least one ridge. A plurality of cutouts is in the form of grooves and/or incisions, said cutouts being defined by facing lateral faces. Each tread pattern element is formed mainly with at least one first rubber mix (referred to as "base mix"). This tread, viewed in section in a plane containing the thickness of this tread, at least one face of height H defining at least one cutout is covered at least in part with a second rubber mix, referred to as "covering mix"This part has covering mix extending over a height Hr at least equal to 30% of the height H of the face, wherein at least one base mix opens on to the contact face when new or at the latest after wear at most equal to 10% of the height Hr. The base mix has an amount of carbon black greater than 2 phr (parts by weight per hundred parts of elastomer) and the covering mix is not devoid of carbon black. The amount of carbon black of said covering mix is greater than 0 phr and less than or equal to 2 phr.

The rubber composition forming the covering mix has the essential characteristic of not being totally devoid of carbon black. Owing to a low amount of carbon black, that is to say an amount of between 0 phr and 2 phr, it is still possible to avoid surface cracking ("crazing") resulting in an improvement in the appearance of the tread patterns even after a certain period of use. This essential difference distinguishes the invention from the solutions of the prior art (EP 1228898, EP 1228903, EP 1228902), according to which it was advocated not to incorporate carbon black ("exclusive of carbon black") in the composition of the covering mixes.

The amount of black of the covering mix is preferably between 0.1 and 1.0 phr, even more preferably between 0.1 and 0.5 phr.

It was noted, surprisingly, that using a quantity of carbon black within this very narrow range of concentration, in which the function of a black coloration agent is still active but the function of an anti-UV agent is not, after exposure to UV radiation (photo-oxidation) of the lateral faces of the tread pattern elements, resulted in a significant increase in grip on wet roads of the tread pattern elements comprising said covering mix, and that of the tread itself.

Suitable carbon blacks are all the carbon blacks capable of providing a black coloration to the rubber compositions, in particular the blacks of the type HAF, ISAF and SAF which are known to the person skilled in the art and are conventionally used in tires, for example the reinforcing carbon blacks of series (ASTM grades) 100, 200 or 300 typically used in the treads of these tires (for example N115, N134, N234, N326, N330, N339, N347, N375), and also those of the non-reinforcing type (because they are less structured) of the higher series 400 to 700 (for example the blacks N660, N683, N772).

By way of example non-reinforcing blacks referred to as "ink blacks" used as black pigments in printing inks and paints could also be used.

The carbon blacks may be used in isolation, as available commercially, or in any other form, for example as supports for some of the rubber-making additives used.

The rubber compositions forming the covering mix and the base mix are both based on at least a diene elastomer and a reinforcing filler, the latter possibly being carbon black and/or a reinforcing inorganic filler, except for the following details which are provided with regard to their respective amounts of carbon black.

"Diene" elastomer (or rubber) is understood to mean, in known manner, an elastomer resulting at least in part (i.e. a homopolymer or a copolymer) from diene monomers (monomers bearing two double carbon-carbon bonds, whether conjugated or not). These diene elastomers may be classed in two categories: "essentially unsaturated" or "essentially saturated".

Generally "essentially unsaturated" is understood to mean a diene elastomer resulting at least in part from conjugated diene monomers, having a content of members or units of diene origin (conjugated dienes) which is greater than 15%

(mole percent). Thus, for example, diene elastomers such as butyl rubbers or copolymers of dienes and of alpha-olefins of the EPDM type do not fall within the preceding definition, and may be described as "essentially saturated" diene elastomers (low or very low content of units of diene origin which is always less than 15%). Within the category of "essentially unsaturated" diene elastomers, "highly unsaturated" diene elastomer is understood to mean in particular a diene elastomer having a content of units of diene origin (conjugated dienes) which is greater than 50%.

These definitions being given, the following are understood more particularly to be meant by diene elastomer (be it of essentially unsaturated or essentially saturated type) capable of being used in the base and covering mix:
(a) any homopolymer obtained by polymerisation of a conjugated diene monomer having 4 to 12 carbon atoms;
(b) any copolymer obtained by copolymerisation of one or more conjugated dienes together or with one or more vinyl-aromatic compounds having 8 to 20 carbon atoms;
(c) a ternary copolymer obtained by copolymerisation of ethylene, of an α-olefin having 3 to 6 carbon atoms with a non-conjugated diene monomer having 6 to 12 carbon atoms, such as, for example, the elastomers obtained from ethylene, from propylene with a non-conjugated diene monomer of the aforementioned type, such as in particular 1,4-hexadiene, ethylidene norbornene or dicyclopentadiene;
(d) a copolymer of isobutylene and isoprene (butyl rubber), and also the halogenated, in particular chlorinated or brominated, versions of this type of copolymer.

According to a preferred embodiment of the invention, the diene elastomer is selected from the group consisting of polybutadienes (BR), polyisoprenes (IR), natural rubber (NR), butadiene copolymers, isoprene copolymers and mixtures of these elastomers. Such copolymers are more preferably selected from the group consisting of butadiene/styrene copolymers (SBR), isoprene/butadiene copolymers (BIR), isoprene/styrene copolymers (SIR) and isoprene/butadiene/styrene copolymers (SBIR).

In particular, when the tread is for example intended for a tire for a vehicle of passenger-vehicle type, the diene elastomer is majoritarily (that is to say to more than 50 phr) an SBR, be it an SBR prepared in emulsion ("ESBR") or an SBR prepared in solution ("SSBR"), or a blend (mixture) of SBR/BR, SBR/NR (or SBR/IR), or alternatively BR/NR (or BR/IR). In the case of an SBR elastomer, in particular an SBR having a styrene content of between 20% and 30% by weight, a content of vinyl bonds of the butadiene fraction of between 15% and 65%, a content of trans-1,4 bonds of between 15% and 75%, and a Tg (glass transition temperature measured in accordance with ASTM D3418-82) of between −20° C. and −55° C. is used; such an SBR may advantageously be used in a mixture with a BR having preferably more than 90% cis-1,4 bonds.

According to another particularly preferred embodiment, the diene elastomer is majoritarily (to more than 50 phr) an isoprene elastomer, in particular when the tread of the invention is intended for a tire for an industrial vehicle such as a heavy vehicle. "Isoprene elastomer" is understood to mean, in known manner, an isoprene homopolymer or copolymer, in other words a diene elastomer selected from the group consisting of natural rubber (NR), synthetic polyisoprenes (IR), the various isoprene copolymers and mixtures of these elastomers. Of the isoprene copolymers, mention will be made in particular of isobutene/isoprene copolymers (butyl rubber-IIR), isoprene/styrene copolymers (SIR), isoprene/butadiene copolymers (BIR) or isoprene/butadiene/styrene copolymers (SBIR). In particular, this isoprene elastomer is preferably natural rubber or a synthetic cis-1,4 polyisoprene; of these synthetic polyisoprenes, preferably polyisoprenes having a content (mole %) of cis-1,4 bonds greater than 90%, more preferably still greater than 98%, are used.

The rubber composition forming the base mix has the characteristic of comprising an amount of carbon black greater than 2 phr: when the carbon black constitutes the majority reinforcing filler, this amount of black may vary within wide limits known to the person skilled in the art, in particular between 30 and 150 phr, and preferably between 40 and 130 phr.

However, according to a preferred embodiment of the invention, the base mix and covering mix both comprise an inorganic filler as reinforcing filler, and also a coupling agent providing in known manner the bond or coupling between the inorganic filler and the elastomer. This reinforcing inorganic filler is preferably a majority filler, that is to say that it represents more than 50% by weight of the total reinforcing filler used in both types of mix.

In this preferred embodiment, the quantity of carbon black in the base mix is preferably within a range from 5 to 20 phr, more preferably still within a range from 5 to 10 phr; within the ranges indicated, there is a benefit to be had from the specific properties (pigmentation and anti-UV) of the carbon black, without furthermore adversely affecting the typical performance provided by the reinforcing inorganic filler (reduced rolling resistance, improved grip). The carbon black is then advantageously selected from among the reinforcing carbon blacks previously mentioned of series (ASTM grades) 100, 200 or 300.

"Reinforcing inorganic filler" is to be understood here, in known manner, to mean any inorganic or mineral filler, whatever its colour and its origin (natural or synthetic), also referred to as "white" filler or sometimes "clear" filler or alternatively "non-black" filler, in contrast to carbon black, which is capable, on its own, without any other means than an intermediate coupling agent, of reinforcing a rubber composition intended for the manufacture of a tire tread, in other words which is capable of replacing a conventional tire-grade carbon black for treads in its reinforcement function; such a filler is generally characterised, in known manner, by the presence of hydroxyl (—OH) groups at its surface.

Preferably, the reinforcing inorganic filler is a filler of the siliceous type, such as silica ($SiO_2$), for example, or of the aluminous type, such as alumina ($Al_2O_3$). Advantageously any reinforcing silica known to the person skilled in the art, in particular a precipitated silica of the highly dispersible type (referred to as "HD") preferably having a BET specific surface area of between 60 and 350 $m^2/g$, may be used. Preferably, the amount of reinforcing inorganic filler is greater than 50 phr, in particular between 60 and 140 phr, more preferably still within a range from 70 to 130 phr in particular when the tread is intended for a passenger-vehicle tire.

The (inorganic filler/diene elastomer) coupling agents are well-known to the person skilled in the art. Any coupling agent capable of ensuring, in the rubber compositions usable for the manufacture of tire treads, the effective bonding between a reinforcing inorganic filler such as silica and a diene elastomer, in particular organosilanes or polyorganosiloxanes which are at least bifunctional, may be used. By way of example a polysulphide of bis-hydroxysilyipropyl or of bis-($C_1$-$C_4$)alkoxysilylpropyl such as, for example bis(3-triethoxysilylpropyl) tetrasulphide, abbreviated to TESPT, is used. The content of coupling agent is preferably between 4 and 12 phr, more preferably between 3 and 8 phr.

In addition to the base constituents previously described, the base mix and covering mix comprise all or some of the conventional additives used in rubber compositions intended for the manufacture of treads, such as, for example plasticisers or extender oils, whether the latter be of aromatic or of non-aromatic nature, pigments, protective agents such as anti-ozone waxes, chemical antiozonants, antioxidants, anti-fatigue agents, reinforcing resins, a cross-linking system based either on sulphur, or on sulphur and/or peroxide and/or bismaleimide donors, vulcanisation accelerators or vulcanisation activators. These compositions may also contain, in addition to the coupling agents, coupling activators or covering agents for the reinforcing inorganic filler.

These compositions comprise, as preferred (non-aromatic or only very slightly aromatic) plasticising agent, at least one compound selected from among the group consisting of naphthenic oils, paraffinic oils, MES oils, TDAE oils, glycerol esters (in particular trioleates), hydrocarbon plasticising resins preferably having a high value of Tg (preferably greater than 30° C.), and mixtures of such compounds.

Preferably, the total thickness of covering mix on covered and opposed lateral faces of one and the same element in relief is at most equal to 50% of the average distance between said lateral faces; "opposed lateral faces of one and the same element in relief" is to be understood to mean lateral faces substantially of the same direction.

Preferably, and in order to have a perceptible effect on the new tire, the covering mix of at least one face is arranged starting from the contact face when new in the direction of the bottom of the cutout defined by said face.

Preferably, the thickness of covering mix is at least equal to 0.2 mm over at least 80% of the height Hr. Even more preferably, the thickness of covering mix is at least equal to 0.2 mm and at most equal to 3 mm, over at least 80% of the height Hr, and even more advantageously between 0.2 mm and 2 mm, over at least 80% of the height Hr.

"Average distance between two opposed lateral faces" is understood to mean the average of the distances between said lateral faces, these distances being measured perpendicular to said lateral faces in question.

"Average thickness of covering mix on a face" is understood to mean the average of the maximum and minimum thicknesses of covering mix, it being understood that these thicknesses are measured on the tire in the initial state perpendicular to the face in question.

"Average distance between a cutout (groove, incision) in question and its closest cutout which is substantially parallel thereto" is understood to mean the average of the maximum and minimum distances between said cutouts.

The tire according to the invention surprisingly makes it possible to obtain a good balance between the wear performance on dry ground and the grip performance on wet ground, because although it was known, in order to obtain a tire of high performance on snow-covered ground, to form elements in relief in a first base mix and to cover the lateral faces of these elements with a layer of low thickness in a mix having an average glass transition temperature (Tg) less than that of the base mix (see for example U.S. Pat. No. 5,840, 137), no document described or suggested the proposed solution.

The covering material may be arranged on the facing lateral faces of elements in relief defining one and the same cutout by covering or not covering the bottom of said cutout.

Advantageously, all the lateral faces of the elements in relief defining grooves of circumferential general orientation are provided with a covering mix having an amount of carbon black greater than 0.05 phr and at most equal to 2 phr and a base mix having an amount of carbon black greater than 2 phr in order to improve very substantially the cornering performance (under transverse stresses) on wet ground or ground which has been rendered slippery. Of course, it is possible to use, according for example to the orientation of the grooves of one and the same tread, different covering mixes in combination with a base mix (or even several base mixes); in this case, each covering mix has an amount of carbon black greater than 0.05 phr and at most equal to 2 phr and each base mix which is directly adjacent thereto has an amount of carbon black greater than 2 phr.

It is known that for various reasons, and in particular owing to the change in properties of the material with use and over time, the level of grip of the tire on wet ground may decrease gradually, even when the material is initially homogeneous within the thickness of the tread. In order to overcome this disadvantage, it is advantageous, in combination with the provisions of the invention, to provide for the presence of a second base mix which adheres better on wet ground than the first base mix and the arrangement of which within the elements in relief is such that this second mix appears gradually over the width on the contact face of said elements, or more generally appears gradually over the width of the running surface of the tread as this tread becomes worn. According to another advantageous variant, the second mix may be identical to the covering mix.

Another aspect of the invention is the use of such a tread for the manufacture of new tires or the retreading of worn tires.

Another aspect of the invention is these tires themselves when they comprise a tread according to the invention.

BREIF DESCRIPTION OF THE DRAWINGS

DETAILED DESCRIPTION OF THE DRAWINGS

Figure 1:
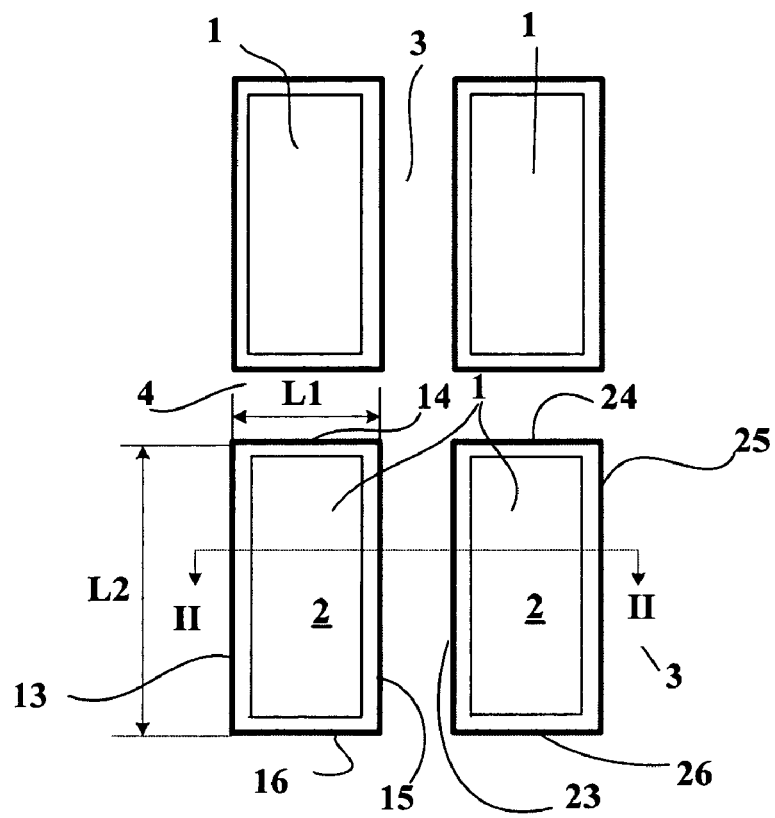
FIG. 1 represents a partial plan view of a block tread pattern of a tread.

In FIG. 1, there can be seen contact faces 2 of blocks 1 of rectangular shape of a tread pattern according to the invention, said blocks 1 being defined by grooves of longitudinal 3 and transverse 4 orientation. Each of these blocks 1 comprises four lateral faces 13, 14, 15, 16, the intersections of which with the contact face 2 form, respectively, ridges 23, 24, 25, 26 which play an important role during travel, and in particular on a roadway which has been rendered slippery (in particular by the presence of water). Each block 1 is rectangular, of width L1 and of length L2; the direction of the length L1 of the blocks in the case described being the same as the longitudinal direction of the tread or alternatively the circumferential direction on the tire provided with said tread.

The four lateral faces 13, 14, 15, 16 are entirely covered with a thickness E1 (visible in FIG. 2) which is substantially constant (over the entire height Hr of coverage, in the present case equal to the depth H of the grooves) of a covering rubber composition MR different from a rubber composition MB (referred to hereafter as base composition) in that these two rubber compositions comprise carbon black in different amounts: the amount of carbon black of the covering mix MR is between 0.05 phr and at most 2 phr, whereas that of the base mix MB is greater than 2 phr.

Figure 2:
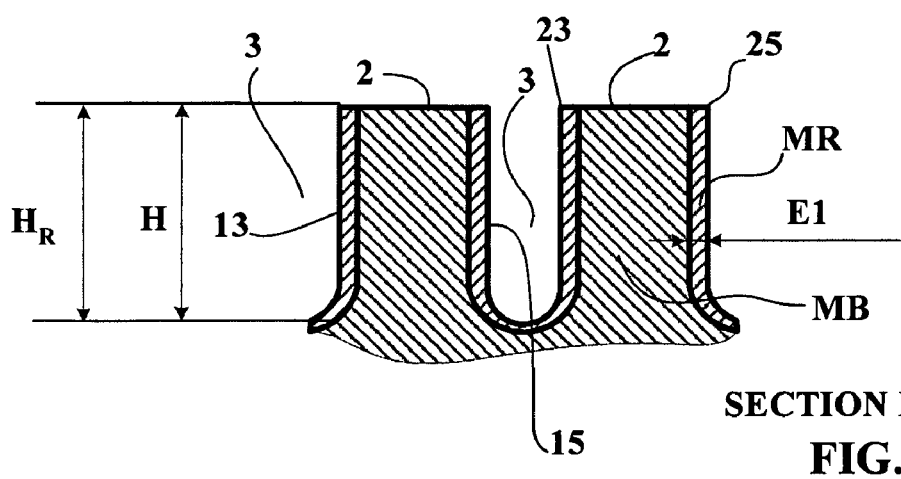
FIG. 2 shows the blocks of FIG. 1 in cross-section along the section line II-II.

On the cross-section shown in FIG. 2 and taken along the line II-II of FIG. 1 and perpendicular to the contact faces 2 of two blocks 1, it can be seen that the lateral faces 13 and 15 limiting the grooves of longitudinal orientation 3 are in total covered with a substantially constant thickness E1 of a covering rubber composition MR which is extended on the bottom of the cutouts 3.

The average thickness E1 of the covering MR of the lateral faces is less than half the total width L1 of the blocks and preferably less than 30% of the width L1 of the blocks 1. Preferably, the totals of the thicknesses of the coverings of two opposed lateral faces in the direction of the width (13, 15) and that of the length (14, 16) are respectively less than 50% of the width L1 and than 50% of the length L2.

Although the technical effect of the invention can surprisingly be obtained with low covering thicknesses (for example, less than or equal to 0.1 mm), it is preferable in order to obtain a significant effect which is durable over time for this average thickness to be at least equal to 0.2 mm in the case of a tread pattern intended for a tread of a passenger-vehicle tire.

The attached table (amounts of the different products expressed in phr) shows two examples of rubber compositions usable, respectively, as base mix (composition C-1) and covering mix (composition C-2). These are two compositions based on known SBR and BR diene elastomers, reinforced by silica and comprising a small or very small quantity of carbon black, prepared using conventional techniques well-known to the person skilled in the art which are not described here in order to simplify the description.

In composition C-1, the carbon black is used, in the amount of 6 phr indicated, essentially as a black pigmentation agent and as an anti-UV agent, in accordance with the teaching of the prior art.

In composition C-2, although the carbon black in the very small amount indicated of 0.3 phr still fulfils its function of a black pigmentation agent, it no longer fulfils that of an effective anti-UV agent, its contribution to the reinforcement furthermore being negligible.

Composition C-2 thus has a very low resistance to photo-oxidation, in other words high photo-oxidisability, compared with that of the composition C-1, which is assumed aposteriori—this at least is what the tire running tests seem to indicate—to be beneficial to grip on wet roads, after a final step of photo-oxidation of the composition C-2 arranged on the lateral faces of the elements in relief. It is in fact assumed that this improved grip would be linked to a modification of the characteristics of the composition at the surface by oxidation, which is beneficial to better gripping of the tire on wet ground. Said photo-oxidation step may consist of simple natural exposure to visible-UV radiation or artificial ageing, for example using a UV lamp or alternatively in an accelerated photo-ageing enclosure.

Compositions C-1 and C-2 previously described were used in treads of radial-carcass passenger-vehicle tires referred to as P-1 and P-2 respectively, of dimension 195/65 R15 (speed index H), which are conventionally manufactured and identical in all points except for the rubber compositions constituting said treads.

Composition C-1 forms all of the tread of the tires P-1 (reference tires) and the base mix of the tread of the elements in relief of the tires P-2 according to the invention, whereas composition C-2 constitutes the covering mix of the lateral faces of all the elements in relief of the tires P-2 according to the invention 2 (in the manner of what was described with reference to FIGS. 1 and 2). This covering mix has a thickness of the order of 0.2 mm over at least 80% of the height of coverage Hr. The tires P-2 adopt substantially the structure described with the support of FIGS. 1 and 2.

After manufacture, the tires P-2 were subjected to UV ageing (natural exposure to visible ultraviolet radiation) for three days. For this UV treatment, the tires were exposed outside, in a static position, in a southerly orientation (sunny Mediterranean site with average daytime temperature of 15° C.), these tires being rotated about their axe by ⅓ of a turn each day, so as to expose their treads completely.

All the tires were then mounted at the front of an automobile (Renault Laguna—front and rear pressure of 2.0 bar) fitted with an ABS braking system, to be subjected to a braking test on wet roads consisting of measuring the distance necessary to go from 50 km/h to 10 km/h upon sudden braking on wetted ground (asphalt concrete).

Under the conditions set forth above, it was unexpectedly noted that the braking distance was reduced by 18% for the vehicle fitted with the tires P-2 according to the invention, compared with the same vehicle fitted with reference tires P-1. This result is all the more unexpected and surprising since the total surface of covering mix (composition C-2) in contact with the ground measured on an imprint of the tire represents only 4% of the total surface of the tread in contact with the ground.

The thickness E1 of coating mix MR may, as is the case here, be substantially uniform over the entire height of the covering and between 0.2 mm and 3 mm and even more preferably between 0.2 mm and 2 mm for a passenger-car tire.

As a variant, it is possible to cover the lateral faces of the elements in relief with different covering rubber compositions according to the lateral faces in question while maintaining an amount of carbon black which is at most equal to 2 phr (likewise, the average thicknesses may be different according to the face in question).

One way of obtaining a tread pattern according to the invention consists for example of covering a tread blank made from a base mix with a layer of covering mix of appropriate thickness before proceeding to mould the tread and the grooves and incisions. After moulding, the covering mix on the contact face of the rib may be left in place or alternatively be removed by mechanical means (in particular by grinding).

The industrial production of a tread according to the invention may consist of laying, on the non-vulcanised tire blank provided with a tread of non-vulcanised base mix, strips of a mix different from the base mix, as described in patent specification EP 0510550 (the strips may be laid on the tread in the circumferential and/or transverse direction). Another way may consist of producing the tread by co-extruding two mixes (or more) at the time of extrusion of the tread.

The invention applied in what has been described above for a tire tread may also be advantageously applied to other fields such as that of caterpillar tracks or alternatively that of shoes and in particular that of shoes for practising sports.

TABLE

| Composition No.: | C-1 (MB) | C-2 (MR) |
|---|---|---|
| SBR (1) | 70 | 70 |
| BR (2) | 30 | 30 |
| carbon black (3) | 6 | — |
| carbon black (4) | — | 0.3 |
| silica (5) | 80 | 80 |
| coupling agent (6) | 6.4 | 6.4 |
| oil (7) | 33.3 | 33.3 |
| DPG (8) | 1.5 | 1.5 |
| ZnO | 2.5 | 2.5 |
| stearic acid | 2 | 2 |
| anti-ozone wax | 1.5 | 1.5 |
| antioxidant (9) | 1.9 | 1.9 |

TABLE-continued

| Composition No.: | C-1 (MB) | C-2 (MR) |
|---|---|---|
| sulphur | 1.1 | 1.1 |
| accelerator (10) | 2.0 | 2.0 |

(1) SBR (expressed as dry SBR) extended with 18% by weight (12.6 phr) of oil (or a total of 82.6 phr of extended SBR); 25% styrene, 58% 1,2-polybutadiene units and 23% trans-1,4-polybutadiene units (Tg = −24° C.);
(2) BR with 4.3% of 1-2; 2.7% of trans; 93% of cis 1-4 (Tg = −106° C.);
(3) carbon black N234;
(4) carbon black N772;
(5) silica "Zeosil 1165MP" from Rhodia, type "HD" - (BET and CTAB: approximately 160 m²/g);
(6) TESPT coupling agent ("Si69" from Degussa);
(7) total aromatic oil (including extender oil for the SBR);
(8) diphenylguanidine (Perkacit DPG from Flexsys);
(9) N-1,3-dimethylbutyl-N-phenylparaphenylenediamine (Santoflex 6-PPD from Flexsys);
(10) N-cyclohexyl-2-benzothiazyl sulphenamide (Santocure CBS from Flexsys).

The invention claimed is:

1. A rubber tread for tires, the tread comprising:
a plurality of tread pattern elements each comprising lateral faces and a contact face for contacting a roadway surface during travel of a tire provided with said tread, a surface of contact of the contact face with the roadway surface forming at least one ridge with at least one of the lateral faces, and
a plurality of cutouts in the form of at least one of grooves and incisions, said cutouts being defined by at least two of the lateral faces facing toward each other,
wherein each of the plurality of tread pattern elements is formed with at least one base mix,
wherein, viewed in section in a plane containing a thickness of said tread, at least one of the lateral faces defining at least one of the plurality of cutouts is covered at least in part with a covering mix, said part having the covering mix extending over a height ($H_R$) at least equal to 30% of a height (H) of the at least one of the lateral faces when the tire is new,
wherein the at least one base mix extends to the contact face when the tire is new or at the latest after wear at most equal to 10% of the height ($H_R$),
wherein the base mix comprises from 5 to 20 phr of carbon black,
wherein the covering mix has an amount of carbon black greater than 0 phr and at most equal to 2 phr, and
wherein the covering mix provides increased grip of the tread on wet roads compared to the base mix.

2. The tread according to claim 1, wherein the covering mix comprises between 0.1 and 1.0 phr of carbon black.

3. The tread according to claim 2, wherein the covering mix comprises between 0.1 and 0.5 phr of carbon black.

4. The tread according to claim 1, wherein the base mix comprises from 5 to 10 phr of carbon black.

5. The tread according to claim 1, wherein an average thickness of the covering mix on the at least one of the lateral faces is at most equal to 50% of an average distance between the at least one of the lateral faces and an opposite lateral face of the same tread pattern element.

6. The tread according to claim 1, wherein the covering mix of the at least one of the lateral faces is arranged starting from the contact face when the tire is new.

7. The tread according to claim 1, wherein the covering mix covers all lateral faces of each of the plurality of tread pattern elements, and wherein a total thickness of the covering mix on opposite lateral faces of each of the plurality of tread pattern elements is at most equal to 50% of an average distance between the opposite lateral faces.

8. The tread according to claim 1, wherein at least one of the lateral faces of said each of the plurality of tread pattern elements defining at least one of the plurality of cutouts is covered at least in part with a covering mix.

9. A tire comprising a tread according to claim 1.

* * * * *